Figure 3:
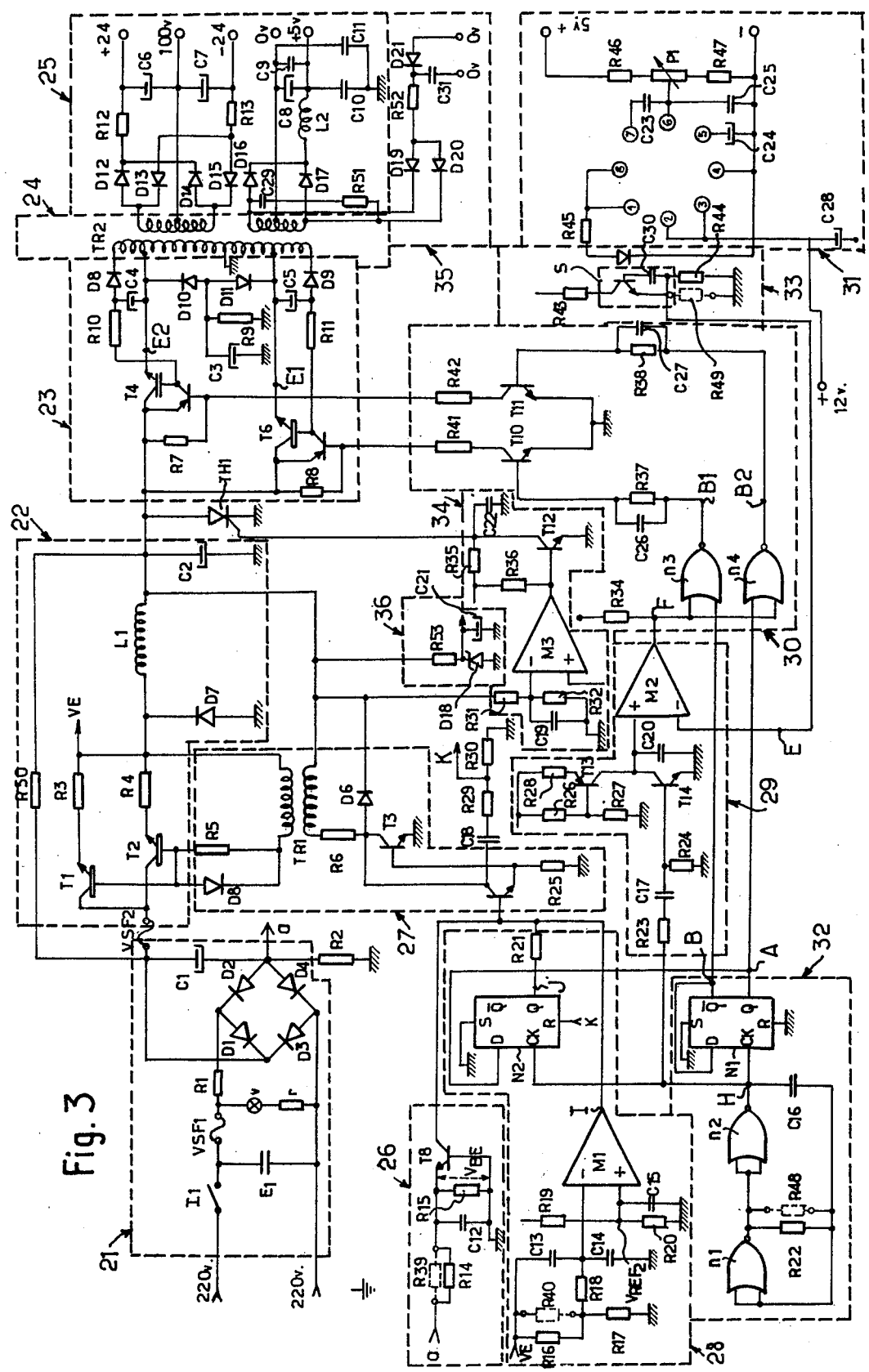

United States Patent [19]

Gautheron

[11] 4,025,862

[45] May 24, 1977

[54] POWER SUPPLY WITH CHOPPING CIRCUIT

[75] Inventor: Jean-François Gautheron, Grenoble, France

[73] Assignee: La Telemecanique Electrique, France

[22] Filed: Dec. 4, 1975

[21] Appl. No.: 637,606

[52] U.S. Cl. .................................. 321/2; 321/14
[51] Int. Cl.² ...................................... H02P 13/22
[58] Field of Search .......................... 321/2, 14, 4; 323/DIG. 1

[56] References Cited

UNITED STATES PATENTS

| | | | |
|---|---|---|---|
| 3,551,777 | 12/1970 | Bigley | 321/2 |
| 3,702,434 | 11/1972 | Ryan | 321/2 |
| 3,818,308 | 6/1974 | Tamari | 321/2 |
| 3,840,798 | 10/1974 | Burchall | 321/2 |
| 3,909,702 | 9/1975 | Hart | 321/2 |

*Primary Examiner*—William H. Beha, Jr.
*Attorney, Agent, or Firm*—William Anthony Drucker

[57] ABSTRACT

An improved power supply apparatus for providing a stabilized low voltage d.c. output from the a.c. mains, comprises two distinct chopper stages, each having its regulation control loop which operates by duty cycle control. The first loop includes a current limiter and provides a rough regulation of the output voltage as a function of the mains variations, whereas the second loop provides a fine regulation of the output voltage as a function of the load variations, and isolation with respect to the load.

3 Claims, 4 Drawing Figures

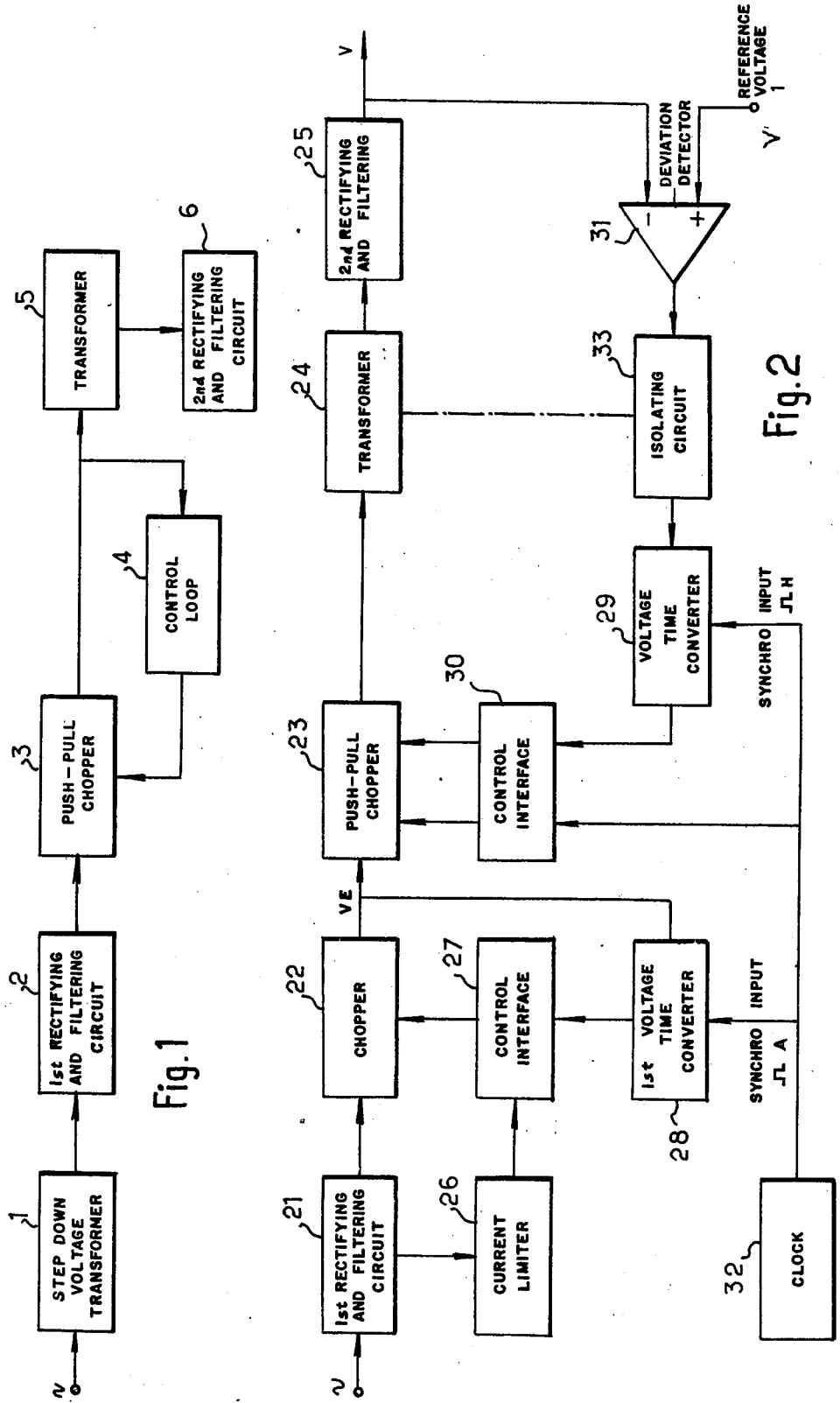

POWER SUPPLY WITH CHOPPING CIRCUIT

The invention relates to a stabilized direct current power supply circuit.

More specifically the invention has for its object a circuit supplying from an alternating current mains at least two stabilized low d.c. voltages isolated from the mains. A circuit of this type is of particular interest for the power supply of computers.

Known stabilized power supply circuits substantially comprise a push-pull chopping circuit, a control loop, a multi-tapped transformer and a filtering and rectifying circuit.

Despite their apparent basic simplicity, these circuits are relatively expensive and complex because on the one hand the chopping circuit elements have to carry all the power and operate at a relatively high voltage, and on the other hand the control loop must react both to mains variations and load variations.

The circuit according to the invention which substantially comprises two chopping circuits and two separate control loops does not suffer from these disadvantages and additionally it ensures a better control.

More specifically, a stabilized supply circuit according to the invention which from an a.c. network supplies lower stabilized d.c. voltages has between the mains and a multi-tapped output transformer followed by rectifiers and filters:
- a rectifying and filtering circuit of the a.c. mains voltage,
- a first chopping circuit supplied by the output voltage of the rectifying and filtering circuit, a second chopping circuit supplied by the output voltage of the first chopping circuit,
- two control loops respectively associated with the first and second chopping circuits.

The invention will be better understood from reading the following description with reference to the drawings, wherein show:

FIG. 1, for information purposes the circuit diagram of conventional stabilized d.c. supply system;

FIG. 2, the circuit diagram of a stabilized supply system according to the invention;

FIG. 3, a preferred embodiment of the invention; and

Figure 4:
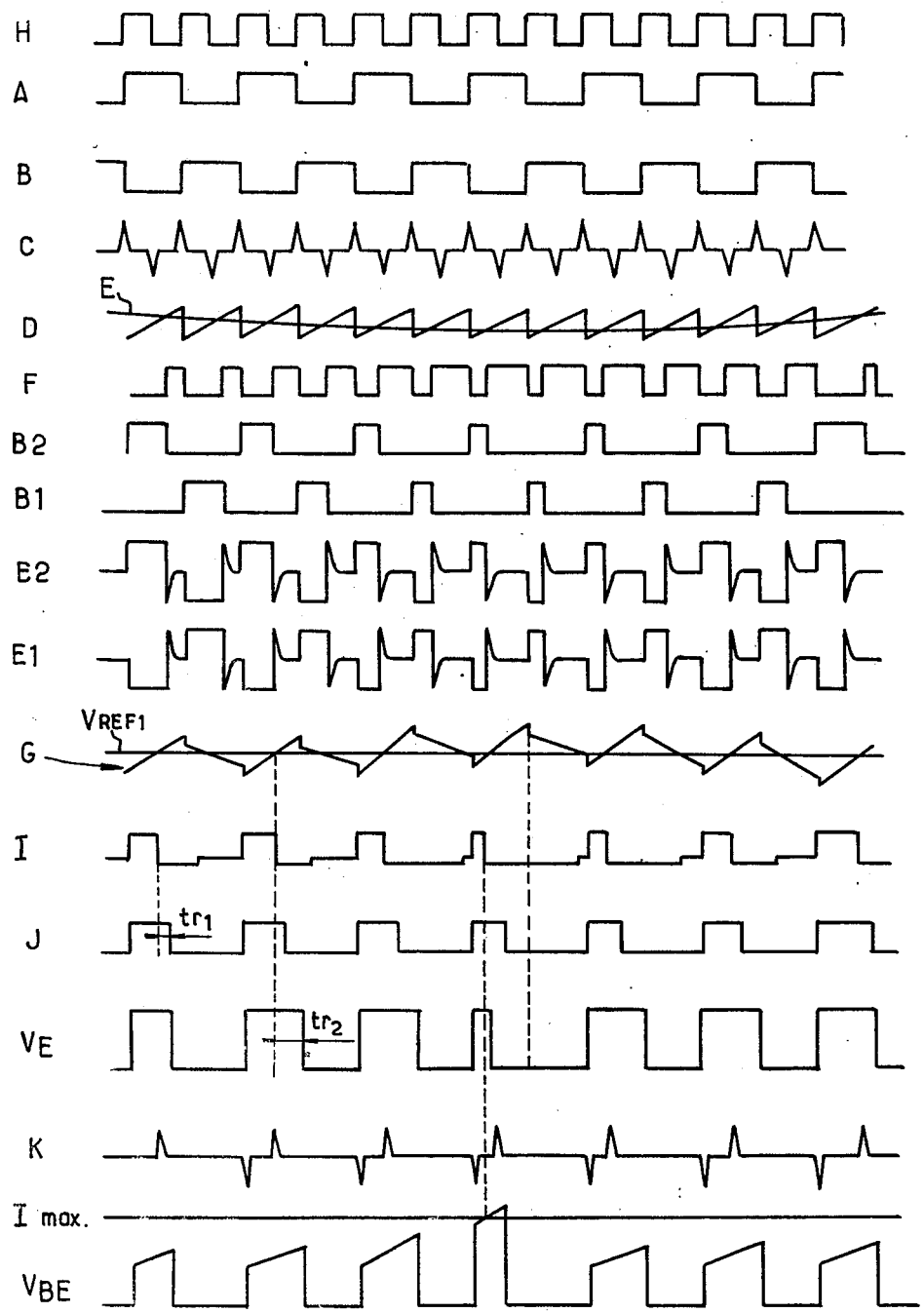

FIG. 4, an explanatory diagram showing as a function of time the signals at various points on the circuit according to the invention.

A conventional stabilized power supply substantially comprises, as shown in FIG. 1, a step-down voltage transformer 1 connected to the mains, followed by a rectifying and filtering circuit 2 which supplies a push-pull chopping circuit 3 and a control loop 4. A transformer 5 which is tapped once or several times depending on the number of desired separate d.c. voltages is connected to the output of the chopping circuit. It is followed by a rectifying and filtering circuit 6.

It can be seen that the chopping circuit must itself carry all the output voltage of transformer 1, and that the control loop must itself deal with all the mains and load irregularities.

On the contrary, as shown in FIG. 2, these two control functions are separated in the system according to the invention and chopping is performed in two stages whereby only the second is push-pull. It results that, although the system according to the invention involves a larger number of separate circuits than a conventional system, the operating conditions of each circuit are much less severe, the overall system is much simpler and less onerous to effect and the voltage is better stabilized therein as the control loops are less rapid.

FIG. 2 shows that the system according to the invention comprises:
- a rectifying and filtering circuit 21 supplied by the a.c. mains,
- a first chopping and filtering circuit 22 supplied by the rectified and filtered voltage from circuit 21,
- a first control loop comprising a first voltage-time converter 28 having a voltage input connected to the output of chopping circuit 22 and a synchronization input connected to the output of an auxialiary clock 32. This converter is connected to the control input of chopping circuit 22 via a control interface 27 which also receives an optional signal from a current limiter 26 which is also supplied with power by rectifying circuit 21,
- a second chopping and filtering circuit 23 which is a push-pull circuit connected to the output of the first chopping circuit 22 and which is followed by an insulating transformer 24,
- a rectifying and filtering circuit 25 operating in the same way as the conventional circuit 26 in FIG. 1 and,
- a second control loop having a voltage-time converter 29. The voltage input of the latter is supplied by the rectifying circuit 25 via a deviation detector 31 which also receives a reference voltage V REF and which is in series with an isolating circuit 33. Its synchronization input is also supplied by clock 32. The converter output is connected to the control input of chopping circuit 23 via control interface 30 which also receives a synchronization signal directly from clock 32.

The operation of this circuit will now be explained with reference to specific operation voltages in order to better illustrate the advantages thereof.

A 220 V, 50 Hz supply voltage is rectified at 21 by a rectifier bridge and filtered. The filtering ensures a power reserve which compensates micro-interruptions of the mains. This voltage is chopped and reduced in stage 22 so that the transistors of stage 23 (described with reference to FIG. 3) operate at low voltage. The latter must in fact withstand a voltage which is double that which they chop, i.e. if there is no intermediate stage 22 twice $\sqrt{2} \times 220^v \neq 600^v \pm 10\%$. However, at present, no transistors exist which can chop such a voltage at the required power (of the order of 300 W) at competitive prices.

The second function of this stage is to permit the control by loop 28-27-26 of the voltage Vc applied to the input of the second chopping stage 23 and to ensure the necessary voltage and current protection. This is brought about by varying the conduction time. Stage 22 reduces the filtered rectified voltage from $300^v$ to $50^v$, i.e. the conduction time $t$ of the transistors must be $t = 50T/300$ wherein $T$ is the clock cycle of frequency 20 KHz. This therefore gives $t \simeq 8\ \mu s$.

The second stage 23 chops the filtered rectified voltage of $50^v$ supplied by stage 22 to supply the primary of transformer 24 whose secondary has for example several taps corresponding, for example, to the voltages $+5^v$, $+24^v$ and $-24^v$. The transformer input voltage is controlled by loop 31, 33, 29 and 30.

The detailed operation of each stage and the control principle involved will be better understood through referring to the preferred embodiment of FIG. 3.

In FIG. 3 broken lines bound the component assemblies corresponding to the various units of FIG. 2. The entire system is synchronized by clock 32 which in the present embodiment has two inverters in the form of NOR gates, n1 and n2 and the oscillating circuit R-C comprising a resistance R22 plus optionally a regulation resistance R48 and a capacitance C16. At point H is provided the 40 Hz system time base signal H shown in the first line of FIG. 4. Flip-flop N1 transforms these H pulses into A and B pulses of double the duration and of opposite sign (cf. FIG. 4) applied to the control interface 30 of the second chopping stage 23. The pulses A are also applied to the voltage-time converter 28 whilst converter 29 receives the actual H pulses.

In block 21 rectification is performed by the four-diode bridge D1 to D4. Filtering which ensures the necessary power reserve is performed by capacitance C1. Resistance R1 in series with the mains limits the current peak in the bridge diodes on making live because at this time there is substantially no charge for the rectified mains, the transistors of the downstream stages being blocked in the manner to be described hereinafter.

It should be noted that a not shown resistance can be arranged in parallel with capacitance C1 in order to ensure the complete discharge after energizing the power supply by opening the cutting-in-switch I1. The spark gap E1 in parallel with the power supply of the bridge ensures the over-voltage protection. Fuse VFS1, indicator V and resistance r represent a fuse-operated indicating system on the mains, whereby VFS2 is a quick-acting line fuse. Resistance R2 makes it possible to measure the output direct current of the bridge at point a. The first chopping and filtering circuit 22 comprises two transistors T1 and T2 balanced by two resistances R3, R4 making it unnecessary to use precisely matched elements. The voltage obtained VE (cf. FIG. 4) i.e. a $300^v$ unfiltered square wave signal, is applied directly to the voltage-time converter 28 which forms a basic component of the first control loop. Diode D7 is a diode whose inverse voltage behaviour is the same as that of transistors T1, T2. It must therefore have a rapid recovery time (less than 200 ns) to prevent over-voltages and current peaks which must be withstood by transistors T1 and T2. The assembly comprising choke 4 and capacitance C2 carries out filtering to the mean value. Resistance R50 shunts the first chopper during energizing and thus raises the voltage Vc on C2. The conduction control of the transistors is performed from clock 32 controlled by the first control loop as will be explained hereinafter.

The current limiting circuit 26 has two resistances R14 and R15 which divide the voltage at point a, optionally a regulation resistance R39 in parallel with resistance R14, a filtering capacitance C12 and a transistor T8 polarised in such a way as to become conductive if the current exceeds a predetermined value. This control of conduction time by the current makes it possible to provide several supplies in parallel because it limits the power supplied. Moreover, it protects the system against possible short circuit and overloads.

The chopped voltage VE (cf. FIG. 4) is applied to the voltage-time converter 28 which comprises : a comparator M1 and a flip-flop N2, a voltage divider bridge, of the voltage VE, constituted by resistances R16, R17, R18 and optionally a regulation resistance R40 in parallel with resistance R16 and two capacitances C13 and C14, as well as a second voltage-divider comprising resistances R19, R20 on the auxiliary voltage of 12 with a capacitance C15 which forms a filtering circuit with resistance R20. The two divided voltages G and $VREF_1$ (cf. FIG. 4) are compared in M1. Flip-flop N2 which on the one hand receives a synchronization signal from clock 32 (input CK) receives at its input D the signal given by flip-flop N1. The clock pulses (in CK) control a switching of the device at a frequency half that of the clock n1, n2, i.e. 20 KHz. The way in which the signal K (shown in FIG; 4) for disarming flip-flop N2 is obtained will be shown hereinafter.

At the bottom of FIG. 4 is shown the voltage VBE, representing the base-collector current of T8 and at I the voltage at the output of comparator M2. It can be seen on the fourth pulse that if an overload appears the voltage VBE which exceeds a certain threshold then interrupts the pulse I a little earlier, thus decreasing the conduction time of transistors T1 and T2. Chopping in circuit 22 is thus performed at the frequency of the pulses in A and B, i.e. at half the frequency of the basic pulses H with a variable conduction time determined by the pulse duration I as indicated in FIG. 4, the signal I resulting from the comparison in comparator M1 of the voltage G, which is a fraction of the voltage VE with a reference voltage $VREF_1$ (which is a fraction of $12^v$). The signal I is applied to transistor T9 of interface 27 which also includes a resistance R25 and a second transistor T3 connected to the primary of a transformer $TR_1$ through resistance R6. The transformer secondary is connected to the bases of transistors T2 and T1 via resistance R5 and diode D5 which ensures a higher inverse current than the direct current. Diode D6 protects the primary against over-voltages. A thyristor TH1 is placed between the first and second chopping circuits so as to protect circuit 23 in the case of a short circuit in transistor T2. Circuit 23 comprises two transistors T4 and T6 each having a transister T10, T11 respectively in their control circuit and resistances in parallel R7, R8 respectively which ensure a better blocking of the transistors. This blocking is increased by the two end windings of the primary of transformer Tr2 of stage 24 and the associated circuits : resistance R10, capacitance C4, diode D8 on D12, one hand, resistance R11, capacitance C5, and diode D9 on the other. The output signals of the emitters of transistors T4 and T6 are represented at E2 and E1 in FIG. 4. Details of the control of this second chopping operation will be provided hereinafter relative to the description of interface 30 and converter 29.

The system comprising capacitance C3, resistance R9 and diodes LD12, D13 protects transistors T4 and T6 against possible overloads. The chopped voltages E1 and E2 are added to the terminals of the central winding of the primary of transformer 24 whose secondary which is in this case in two parts supplies after rectifying (diodes D12, D13, D14, D15, D16, D17) and filtering (resistances R12, R13, choke L2, capacitances C6, C7, C8, C10, C11) regulated voltages $\pm 24^v$ and $+5^v$. The diodes of the rectifying circuit 25 must be high-speed diodes (operating at 20 Hz), e.g. Shotky diodes with a low direct voltage ($0.4^v$ at 30 A) as rectifying is carried out at low voltage.

The load control loop comprises a comparison circuit 31 formed by an integrated regulator having multiple terminals numbered 1 to 8, and a $+5^v$ voltage is applied to the "sense" terminal. A $12^v$ voltage supplies the regulator and permits the starting of magnetisation. Resistances R43, R44, R45, capacitances C30 and unit S which is located between elements 30 and 31 form the isolating circuit 33 for the control loop. Unit S comprises a light emitter diode and a photosensitive transistor which is connected to the negative input of comparator M2 of the voltage-time converter circuit 29 (signal E, FIG. 4). The positive input of comparator M2 receives the sawtooth D (FIG. 4) prepared from signal H by the input circuit of 29 : resistance 23, capacitance 17, resistance R24, resistances R26 and R28, optionally regulation resistance R27, transistors T13 and T14 and capacitance C14. The output signals F from the comparator are of variable duration as a function of the level of E, i.e. as a function of the load. They are applied to the interface 30 formed by two gates NOR, n3 and n4 which receive the signal F and respectively signals A and B of 20 Hz in phase opposition. The output signals of n3 and n4 are shown at B1 and B2 in FIG. 4. They are respectively applied to the bases of transistors T10, T11 through the parallel capacitance-resistance circuits (C26, R37 for T10, C27, R38 for T11). The signals collected on the collectors of T10 and T11 are applied by resistances R41 and R42 respectively to the bases of transistors T7 and T5 controlling transistors T6 and T4. Circuit 34 which comprises a capacitance C19, two resistance bridges R31, R32 and R35, R36 ensures the control of the protection thyristor Th1 located between circuits 22 and 23, whereby fuse FS2 ensures the protection of circuit 22 during the operation of thyristor Th1 after a significant overload at the terminals of C2 (output of the first chopping stage 22).

Unit 35 which comprises diodes D19 ad D20, resistance R52, capacitance C31 and photo-diode D21 is a monitoring device for the +5$^v$ voltage, whereby photo-diode D21 serves as a light signal. This unit makes it possible to monitor the operation of each of the power supplies when they are arranged in parallel.

Capacitance C18 and resistance R29 and R30 placed above circuit 29 between elements 27 and 34 are in fact elements of converter 28, whereby the assembly C18-R29-R30 is used to zero the loop through the input K of flip-flop N2.

The +12$^v$ power supply of the electronic assembly is provided by circuit 26 which is located above circuit 34 and comprises resistance R53, Zener diode D18 and capacitance C21.

Elements 21, 22, 23, 24, 25 are power circuits, the average current intensity thereof exceeding 1A.

However, the current intensity in the control circuits 26 to 34 does not exceed a few milliamperes. The elements used in making these circuits are known to the skilled man. As a non-limitative example, it is given hereinafter certain values for the various resistances and capacitances used, together with the power ratings and the specifications of the elements used in effecting the stabilized supply according to the invention.

| | |
|---|---|
| Unit (element) 21 : | R1 : 3.3 Ohms - 4 W ; C1 : 470 pF at 450$^v$ |
| Unit (element) 22 : | R3, R4 : 0.5 Ohms - 4 W ; L1 : 2 mH ; R50 : 22 K Ohms, 4 W ; T1, T2 : type ESM 16 ; |
| Unit (element) 23 : | R7, R8 : 120 Ohms - 0.5 W ; R9 : 340 Ohms R10, R11 : 33 Ohms ; 2 W ; R9 : 240 Ohms 10 W ; T4, T6 : type BU × 40 ; T5, T7 : type MIE 254 ; C3 : 22 pF ; |
| Unit (element) 24 : | Transformer Tr2 is in this case produced on a THT type ferrite of a television receiver with about 30 turns to the primary and twice four turns to the secondary, |

-continued

| | |
|---|---|
| | whereby the number of turns is relatively small as the circuit operates at 20 Hz permitting the use of ferrites with a very high induction. |
| Unt (element) 25 : | R12, R13 : 0.2 Ohms - 4 W ; R51 : 35 Ohms; C6, C7 : 220 pF - 100 V ; C8 : 6800 pF ; C10, C11 : 10 nF ; |
| Unit (element) 26 : | R2 : 0.2 Ohms - 4 W (this resistance occurs between the two units (elements) 21 and 26 ; C12 : 13 nF ; R15 : 120 Ohms ; |
| Unit (element) 27 : | R5 : 4,7 Ohms ; R6 : 47 Ohms ; R25 : 150 Ohms ; T9 : type 2N2243 ; T3 : type MIE 225; |
| Units (elements) 28-29-34 : | A 3302P box is used for the three comparators M1, M2, M3, which in fact contains four comparators, one of which is not used here. C13 : 22 pF ; R17 : 6.8 v ; R19, R20, R23, R24, R27 : 10 k Ohms ; C15 : 4.7 pF ; R26 : 2.2 k Ohms ; R36, R28 : 15 k Ohms ; C20 : 33 nF ; R31 : 12 k Ohms ; R32 : 3.3 k Ohms ; R35 : 240 Ohms ; flip-flop N2 : box 4013 containing 2 type D flip-flops; |
| Units (elements) 32 and 30 | Flip-flop N1 : 4013 like N1 ; n1, n2, n3, n4 together formed by a box 4001 which contains four NOR gates : R22, R37, R38, 10 k Ohms ; C26, C27 : 1 nF ; |
| Unit (element) 31 : | integrated regulator type 2303 ; R45 : 1 k Ohm ; P1 : variable resistance of 0 to 1 k Ohm ; R46 : 4.7 k Ohms ; R47 : 2.2 k Ohms ; C24 : 1 pH ; |
| Unit (element) 33 : | S comprises a MCT2 box. |

Although the above embodiment is constructed according to MOS technology which is particularly compact, the corcuit according to the invention whose wiring diagram is shown in FIG. 2 can be produced according to any other suitable technology. As the power of this circuit is limited to that supplied by the current limiting circuit, it can be connected in parallel with other identical circuits, hence its particular but not exclusive significance for the power supply of computers whose power varies substantially and within very wide limits with the configurations used.

As the consuption of the clock and control circuits is very low when constructed according to MOS technology, the starting of the first chopping circuit takes place automatically on energization without any need for a secondary source. The starting of the second chopping circuit may or may not be externally controlled.

It should also be noted that in the arrangement described the current limitation is only involved in connection with the first chopping circuit, and this first circuit is thus protected in the case of a short circuit of one of the switches of the second chopping circuit.

The second chopping circuit ensures the precise regulation of the output voltage and the isolation of the operating device. It is protected against a failure of the first chopping circuit.

I claim:

1. A power supply apparatus for providing a stabilised direct current output from an alternating current input, comprising: input filtering and rectifying means connected to the alternating current input and producing a rectified and filtered output, first chopper means for converting said rectified and filtered output to a periodic square wave signal having a variable mark-tospace ratio, said first chopper means having a control input and an output; first auxiliary rectifying and filtering means connected at the output of the first chopper means; second push-pull mounted chopper means connected to the first auxiliary rectifying and filtering means and providing a further square-wave signal having a variable mark-to-space ratio and a fixed repetition rate, said second chopper means having a control input and an output, a transformer having a primary winding connected to the output of the second chopper means and a secondary winding; output filtering and rectifying means connected to the secondary winding of the transformer; comparator means connected to the output of the first chopper means and to a reference voltage source for comparing the variations of the said square wave signal to a reference voltage and providing a control square wave signal having a variable mark-to-space ratio; means connecting the control square wave signal to the control input of the first chopper means; and further comparator means for comparing the variations of the stabilised direct current output to a further reference voltage and providing a further control square wave signal having a variable mark-to-space ratio and means connecting the said further control square wave signal to the control input of the second chopper means.

2. A power supply apparatus as claimed in claim 1, wherein said means connecting the control square wave signal to the control input of the chopper means include gating means having an inhibiting input, said apparatus further comprising current limiter means connected to the input filtering and rectifying means for applying an inhibiting signal on the inhibiting input of the gating means each time the said rectified and filtered output exceeds a predetermined value.

3. A power supply apparatus as claimed in claim 1, wherein the further comparator means include means for comparing the stabilised direct current output to a said reference voltage and providing a direct current error signal; light emitting means connected to said direct current error signal; light sensitive means cooperating with said light emitting means to provide a further direct current error signal; means generating a saw-tooth wave signal having the same repetition rate as the said further square-wave signal; and means for comparing the further direct current error signal and of the saw-tooth wave signal to provide the said further square-wave control signal.

* * * * *